March 22, 1949.  A. I. BEAN  2,464,961
VARIABLE STROKE SHAPING MACHINE
Filed Nov. 1, 1943  3 Sheets-Sheet 1

Inventor
Arthur I. Bean
by Wright, Brown,
Quinby & May Attys.

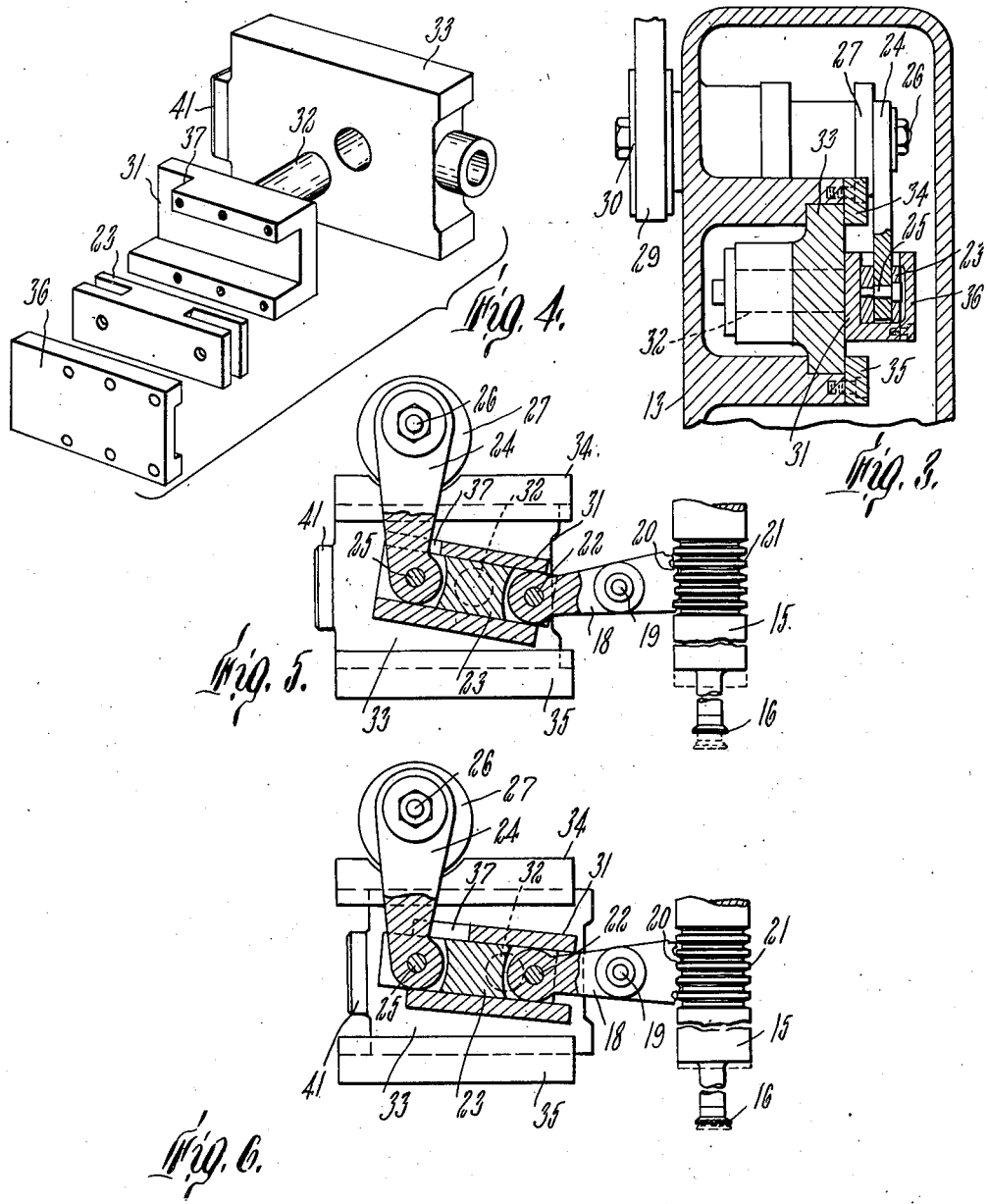

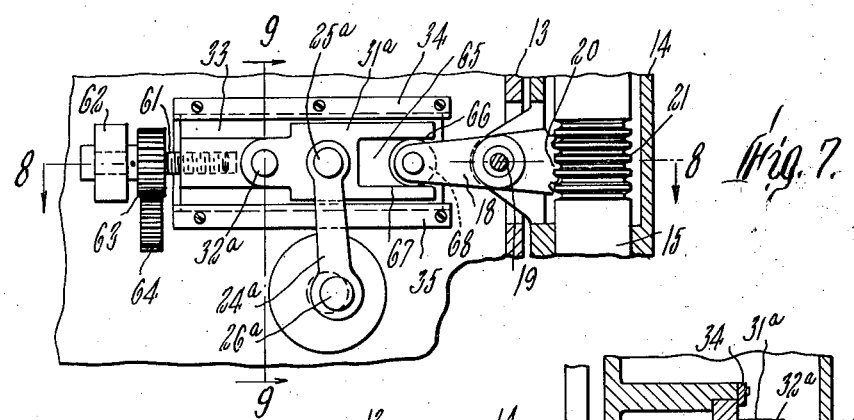
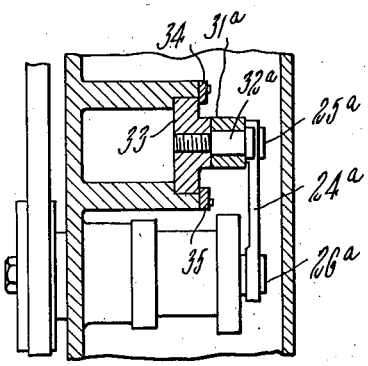
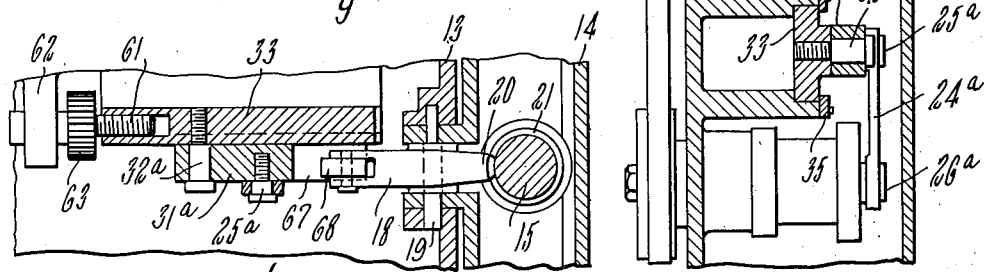
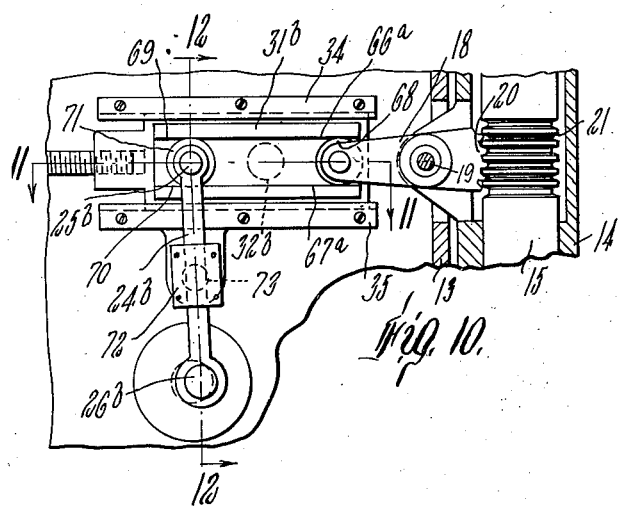
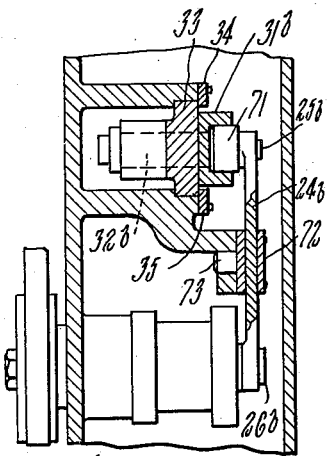
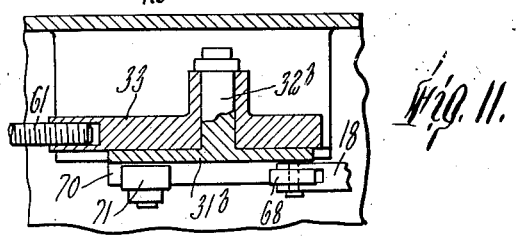

Patented Mar. 22, 1949

2,464,961

UNITED STATES PATENT OFFICE 2,464,961

VARIABLE STROKE SHAPING MACHINE

Arthur I. Bean, Springfield, Vt., assignor to The Fellows Gear Shaper Company, Springfield, Vt., a corporation of Vermont Application November 1, 1943, Serial No. 508,597

11 Claims. (Cl. 90—7)

The object of the present invention is to provide means for varying the length of stroke of a reciprocating spindle in a gear shaping machine, or other machine tool having a reciprocatory holder adapted to carry a cutter or a work piece, in the course of operation of the machine and of a continuing series of strokes of such a spindle or holder and without stopping the machine or otherwise interrupting its action. A further object is to provide means for controlling the stroke varying mechanism automatically so as to change the length of the stroke by predetermined amounts at prescribed times during the progress of machining action on a work piece.

One field of utility for the invention is in generating and cutting gears of which the tooth bearing portion or zone varies in width at different points and where it is necessary to lengthen or shorten the stroke of the cutting tool in more or less near ratio to the variations of such width. Gears have been designed for special uses in which such width variations are required and in which obstructions prevent the cutting of complete teeth in portions of all widths by a cutter which is moved through strokes of invariable length at all times. The present invention has been devised to enable gears of that character to be generated and cut automatically, accurately and efficiently; and it is here illustrated in connection with a gear generating machine of the type having a rotatable and reciprocable cutter spindle. More particularly the machine so illustrated includes some of the features shown in prior patents of Edward W. Miller No. 2,107,543, dated February 8, 1938, and No. 2,129,858, dated September 13, 1938. I wish to make it clear, however, that this illustration is merely for the purpose of explaining the general principles of the invention and that these principles may be embodied in many diverse forms and for other uses and purposes, in all of which a reciprocable spindle or carrier is employed.

In the drawings,

Figure 3 is a vertical section taken on the line 3—3 of Figure 1.

Figure 4 is a disassembled perspective view of the adjustable members of the mechanism by which reciprocating movement is imparted to the cutter spindle of the machine, and by adjustment of which the length of stroke may be varied.

Figures 5 and 6 are elevations, partly in section, of the stroke-imparting mechanism shown in different adjustments.

Figure 7 is an elevation of a modified form of the invention.

Figures 1, 2:
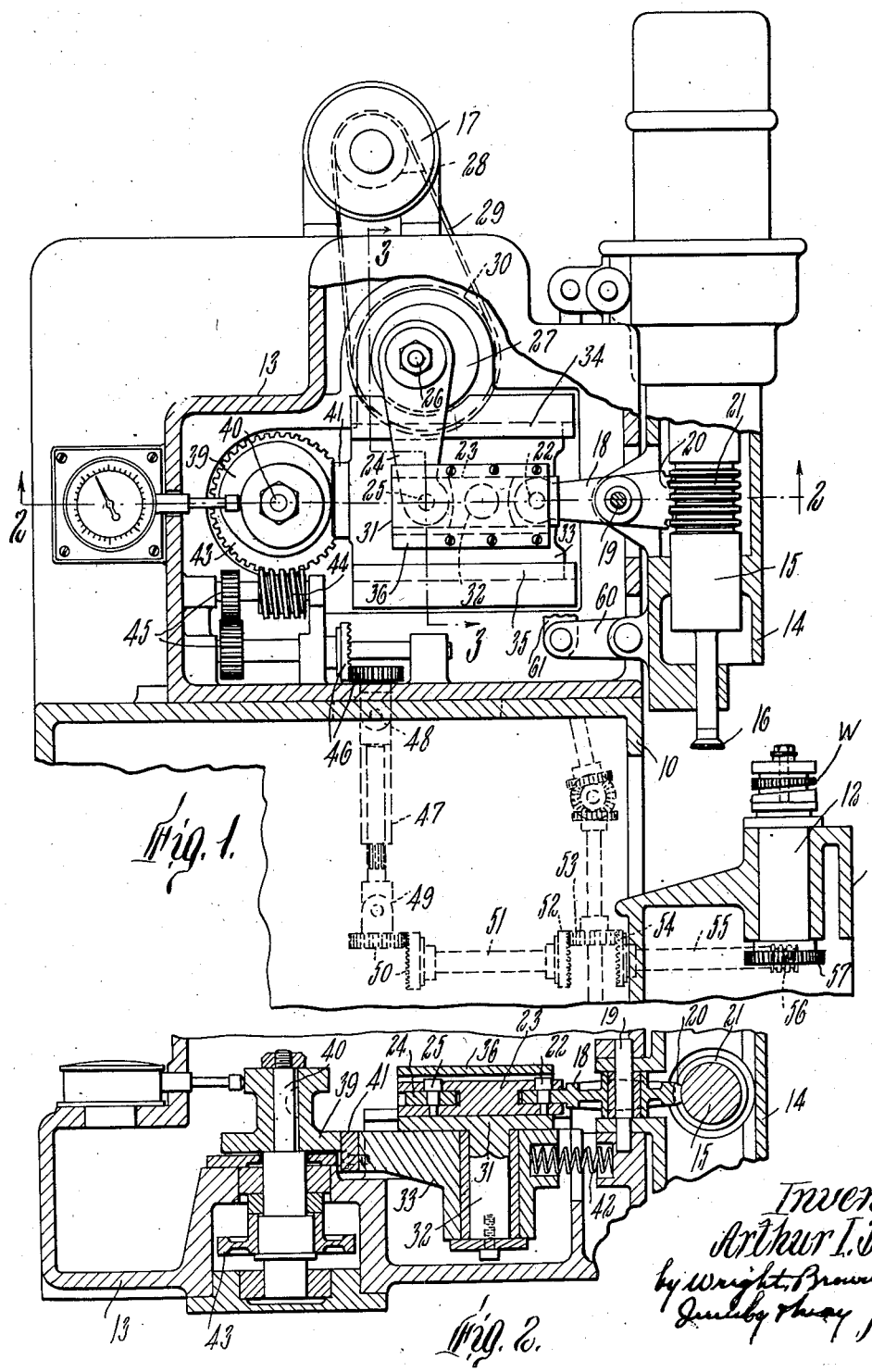
Figure 1 is a partial vertical section of a gear shaping machine in which the invention is embodied.
Figure 2 is a cross section on the line 2—2 of Figure 1, looking in the direction of the arrows on that line.

Figures 8 and 9 are sections on lines 8—8 and 9—9 respectively of Figure 7.

Figure 10 is an elevation of a further embodiment of the invention.

Figures 11 and 12 are sections on lines 11—11 and 12—12 respectively of Figure 10.

Like reference characters designate the same parts wherever they occur in all of the figures.

The illustrative machine shown here has a base 10 which includes a bracket 11 wherein a work spindle 12 is rotatably supported and on which a carriage 13 is mounted with provision for movement in known manner toward and away from the work spindle. Said carriage supports a saddle 14 in which a cutter spindle 15 is mounted to rotate and reciprocate. Spindle 15 is adapted to carry a cutting tool, such as the gear shaper cutter 16 here shown, in operative relation to a work piece W suitably mounted on work spindle 12. This work piece illustrates one type of gear in which the toothed zone is of varying width.

A motor 17 rotates the spindles 12 and 15 at suitable harmonious ratio for the generation of gear teeth, by mechanism partially shown diagrammatically and which may be the same as that shown diagrammatically in the above-named patent No. 2,129,858. The details of the rotation transmitting mechanism are not important for the present invention, and various mechanisms may be used for this purpose. It is sufficient to state that the machine is equipped with means for suitably rotating the spindles.

The cutter spindle is reciprocated by a lever 18 mounted to turn about the pivot 19 which couples the cutter saddle 14 to the carriage 13. One arm of lever 18 carries a gear segment 20 meshing with encircling rack teeth 21 on the spindle. The other arm of the lever extends away from the spindle and is coupled by a pivot pin 22 with a link 23, which link is coupled also to a connecting rod 24 by a pivot pin 25. The connecting rod or pitman 24 is connected at its end remote from the pivot 25 with a crank pin 26 carried by a shaft 27 which is driven from the motor 17 by a belt and pulley drive 28, 29, 30.

Link 23 is fitted with provisions for lengthwise sliding movement in a guideway in a rocker 31 which is coupled by a pivot 32 with a slide 33. Said slide is mounted between guides 34 and 35 on the carriage 13 which are so arranged that the slide may be moved toward and away from the spindle. The link 23 is preferably so closely fitted in the guideway or rocker 31 that it can have no appreciable movement relative to the latter except movement endwise. It is confined in the rocker by a cover plate 36 which bridges across the guideway and is secured detachably to the rocker.

These parts are relatively so arranged that the axes of the pivots 19, 22, 32 and 25 are substantially parallel to each other, and are more or less nearly in the same plane perpendicular to the spindle 15 when the spindle and the crank 26 are in mid stroke. In other words, when in the position shown in Figure 1, the intersections of these axes with the plane of the drawing are in the same straight line. Variations in greater or less measure from this arrangement are possible, however, as will later appear. The crank shaft is located at one side of this line in a position which causes the connecting rod 24 to extend transversely to arm 32—25 at a large enough angle for effective transmission of rocking motion thereto. The link 23 and rocker 31 rock in unison on the bearing of pivot 32 in slide 33 when the crank 26 is revolved around the axis of shaft 27, and the rocking link then transmits angular movement to lever 18 about its pivot 19, whereby the spindle is moved endwise. The freedom for sliding movement of link 23 in its guideway compensates for the arcuate path in which the pivot 22 is constrained to move, and the connecting rod 24 is free to swing about the crank pin 26 to such extent as is needed to permit the accommodating endwise movement of the link. This connecting rod enters the link guideway through a notch 37 in the nearer wall of the guideway.

Displacement of slide 33 in the path to which it is constrained by the guides 34 and 35 shifts the rocker 31 and its pivot 32 relatively to the connecting pivots 22 and 25, thereby shifting the fulcrum axis (the axis of pivot 32) of the rocker link 23 and altering the ratio of the rocker arms 32—22 and 32—25. Thereby the stroke imparted to the spindle is altered.

Figure 5 shows by full and broken lines respectively the limits of movement of the spindle and cutter when the ratio of arm 32—22 to arm 32—25 is relatively large; and Figure 6 similarly shows the length of stroke when this rocker arm ratio is smaller. In both figures the crank pin is shown at the highest point of its orbit and the parts of the linkage are shown in corresponding positions. Obviously the fulcrum pivot 32 may be located at positions between or beyond those here illustrated. The practical limits of its operative adjustment are those in which, respectively, it coincides with the pivot 22 (when no movement of the lever 18 will take place) and is too near the pivot 25 to transmit force and motion effectively.

When the alinement of pivots 22, 32, 25 with relation to the spindle path is that here shown and precedently described, adjustments of the rocker cause both limits of the cutter stroke to be changed equally with respect to the mid position of the cutter. But the pivots may be otherwise arranged, as for instance, so as to be in a plane perpendicular to the spindle when the spindle is at one or the other end of its stroke, whereby one of such limits will remain the same when the length of stroke is altered.

The length of spindle stroke may be changed progressively, intermittently, or at prescribed times and by prescribed amounts while the reciprocation of the spindle continues without interruption or change of rate; and it is a part of the invention to furnish means for doing so. The means shown in Figs. 1–6 for this purpose comprises a cam 39 carried by a shaft 40 and arranged to bear on an abutment 41 of the slide. A spring 42, shown in Figure 2, reacts between the slide 33 and a portion of the carriage 13 and continuously presses the abutment 41 against the cam. A gear 43 keyed to the shaft 40 meshes with a worm 44 which is rotated in a desired timed relationship with the work spindle 12. A transmission train for so driving the worm is here shown illustratively as comprising a gear pair 45, shaft, gear couple 46, telescopic shaft 47, universal joints 48 and 49, gear pair 50, shaft 51 and gear 52, the latter being driven by a gear 53 which drives the spindle rotating train 54, 55, 56, 57. By means of this mechanism, but with substitution of cams and abutments having various different contours for the cam 39 and abutment 41, the slide 33 may be shifted through desired distances with successive increments of rotation of the work spindle and either in the same direction or with reversals of direction.

This stroke-changing mechanism, or its equivalent, may be combined with a radially adjustable crank pin and an extensible connecting rod, such as are shown in the Patent No. 2,107,543 previously mentioned, instead of the pin of fixed eccentricity and connecting rod of fixed length here shown, whereby the advantages due to retained adjustments of those elements may be utilized in the same machine with the advantages of the instantaneous stroke variations herein described.

Either spindle may be utilized to carry the cutter and the other a piece of work. Or, by reversals of some of the parts, the work spindle may be reciprocated with a variable stroke. In either case, whether the cutter carrying spindle or the work carrying spindle is reciprocated, the mechanism for automatically varying the strokes works in timed relation or in given ratio with the work-carrying spindle. For example, the spindle 15 is rotated in a prescribed ratio to the rotation of the spindle 12 by means such as shown in the previously mentioned Patent No. 2,129,858; hence its rotation has a definite ratio to the rotation of the cam 39.

The cutter is backed off from the work at the conclusion of cutting strokes so that it will not rub during its return strokes. To accomplish such backing off movement, the cutter saddle 14 is pivoted to the carriage by the pivot 19, and its end nearest to the cutter is coupled by a link 60 with a lever 61 which is oscillated by a cam on shaft 27 in suitable timing with the reciprocation of the spindle 15, substantially in the manner shown in the precedently named patents.

Among the many possible variations in which the invention may be embodied, two have been selected for present illustration. One of these, shown in Figures 7, 8 and 9, has a slide 33 substantially like that shown in the preceding figures and arranged for movement toward and away from the spindle in guides 34 and 35. It is adapted to be so moved by a screw shaft 61 mounted rotatably in a fixed bearing 62, in which it is restrained by flanking abutments from endwise movement. This screw shaft may be rotated manually or automatically by mechanism typified by gears 63 and 64. A rocker 31a is coupled by a pivot 32a with slide 33 and with a driving crank 26a by a connecting rod 24a and wrist pin 25a. It contains a slot or notch 65 having parallel bounding surfaces 66 and 67 between which is confined a roller 68 on the spindle driving lever 18. This embodiment differs from the one first described in that the lever 18 and wrist pivot 25a are engaged directly with the rocker, that the link 23 is omitted, that both arms of the rocker are at the same side of its fulcrum, and that the crank is below the rocker. When the slide is shifted toward and away from the spindle, the lever arm 32—68 is shortened or lengthened, without altering the length of lever arm 32a—25a. Otherwise, and in principle, the mechanism is essentially the same as that first described. The axes of roller 68, pivot 25a and pivot 32a are in substantially the same plane, which plane is transverse to the path of the spindle and preferably substantially perpendicular to that path in one position of the rocker; and the crank is located at one side of that plane.

The further modification, shown in Figures 10, 11 and 12, differs from the one shown in Figures 7, 8 and 9, in that the rocker 31b is slidingly engaged with the wrist pivot of the connecting rod as well as with the spindle-operating lever, having guides 69 and 70, between which a roller 71 on the pivot 25b is confined. These guides may be continuations of the guides 66a and 67a which embrace the roller 68 on the spindle operating lever, or they may be otherwise arranged. The fulcrum pivot 32b is located between the rollers 71 and 68, although it might equally well be located with respect to said rollers in substantially the same relation as that of the fulcrum 32a with respect to the pivot 25a and roller 68 shown in Figures 7 and 8. The connecting rod 24b between the pivot 25b and crank 26b is arranged substantially as is the corresponding connecting rod in Figure 7 except that, to maintain its distance from the fulcrum pivot within operative limits, it is embraced by a guide block 72 which has a pivotal connection at 73 with a fixed bearing and through which the connecting rod is adapted to slide endwise. The rocker is supported through its fulcrum pivot 32b by a slide 33, as in the preceding cases, which slide may be shifted by means like those previously shown and described, or of other suitable character.

Many other modifications may be made without departing from the principles of the invention.

What I claim and desire to secure by Letters Patent is:

1. A machine comprising a supporting structure, a member supported on said structure for movement in a given path, a pivotally mounted lever having two arms one of which is engaged with said member for imparting reciprocating movement thereto, a rocker in connection with the other arm of said lever, means including a crank in coupled connection with said rocker for imparting oscillating movement through the rocker to the lever, and adjusting means operable while the machine is in continuous action for varying the extent of movement imparted by the rocker to the lever.

2. A machine comprising a supporting structure, a spindle mounted to reciprocate in said structure, a slide mounted on said structure so as to be movable toward and away from said spindle, a rocker pivoted to said slide having a driven arm and a driving arm, means for applying force in alternately opposite directions to said driven arm whereby the rocker is oscillated, and transmission means connected to said driving arm arranged to impart reciprocating movement to the spindle when the rocker is oscillated; said connections with the driven and driving arms being relatively shiftable with respect to the rocker so that shifting of said slide causes the effective ratio of the rocker arms to be varied.

3. In a machine tool, a reciprocable tool holder, a work holder, means for so moving said work holder as to present different parts of a work piece successively to a tool carried by the tool holder, a rocker having a fulcrum engagement with the machine and being in pivotal motion-transmitting connection with the tool holder, a driver in pivoted motion-transmitting connection with the rocker, means for altering the distances between the fulcrum of the rocker and the pivotal connections of the rocker with the tool holder and the driving means, and means for timing the action of the last named means with the movement of the work holder.

4. A machine comprising a supporting structure, a reciprocable member supported on said structure for movement in a given path, a pivotally mounted lever having two arms, one of which is engaged with said reciprocating part, a rocker in fulcrumed engagement with the supporting structure having two arms, one of which is in pivotal connection with the other arm of said lever, a crank member rotatable on said supporting structure, and a connecting rod connected to said crank and in pivotal connection with the other arm of said rocker, the rocker fulcrum and said pivotal connections being relatively shiftable in a manner to alter unequally the distances between the rocker fulcrum and the respective pivotal connections.

5. A machine comprising a supporting structure, a reciprocating member, a lever pivoted to the supporting structure in motion-transmitting engagement with said reciprocating part and having an arm projecting away from its pivot, a link in pivotal connection with said arm, a connecting rod in pivotal connection with said link at a distance from the before named pivotal connection, a crank in driving connection with said connecting rod and so arranged that the straight line between the second named pivotal connection and the axis of revolution of the crank is transverse to the straight line joining the two pivotal connections and transverse likewise to the lever arm, and a rocker having a guideway in which said link is fitted with provisions for relative movement along the line joining said pivotal connections and prevention of relative movement in the direction of the line between the second named pivotal connection and the axis of crank revolution, said rocker having a fulcrum engagement with the machine on an axis substantially parallel and in the same plane with the axes of said pivotal connections, said rocker and its fulcrum being shiftable along the line joining said pivotal connections.

6. A machine comprising a supporting structure, a reciprocating member, a lever pivoted to the supporting structure in motion-transmitting engagement with said reciprocating part and having an arm projecting away from its pivot, a link in pivotal connection with said arm, a connecting rod in pivotal connection with said link at a distance from the before named pivotal connection, a crank in driving connection with said connecting rod and so arranged that the straight line between the second named pivotal connection and the axis of revolution of the crank is transverse to the straight line joining the two pivotal connections and transverse likewise to the lever arm, a rocker having a guideway in which said link is fitted with provisions for relative movement along the line joining said pivotal connections and prevention of relative movement in the direction of the line between the second named pivotal connection and the axis of crank revolution, said rocker having a fulcrum engagement with the machine on an axis substantially parallel and in the same plane with the axes of said pivotal connections, said rocker and its fulcrum being shiftable along the line joining said pivotal connections, and means for so shifting the rocker at predetermined times in the cycle of operations of the machine.

7. A gear shaping machine comprising a supporting structure, a spindle mounted to reciprocate on said supporting structure, a lever coupled with said spindle to impart reciprocating motion thereto having an arm extending from its point of engagement with the supporting structure, a slide mounted to move in a path toward and away from said spindle, a rocker having a pivotal connection with said slide of which the axis is transverse to the path of movement of the slide, said rocker having also a guideway extending in the general direction of the path of the slide, a link fitted in said guideway for sliding movement only relatively to the rocker, a pivotal connection between one end of said link and said lever, a connecting rod in pivotal connection with the other end of said link at the opposite side of the rocker fulcrum from the first named pivotal connection, and a crank operatively associated with the connecting rod to impart oscillative movement to the rocker through the pivotal connection of the connecting rod with the link.

8. A gear shaping machine comprising a supporting structure, a spindle mounted to reciprocate on said supporting structure, a lever coupled with said spindle to impart reciprocating motion thereto having an arm extending from its point of engagement with the supporting structure, a slide mounted to move in a path toward and away from said spindle, a rocker having a pivotal connection with said slide of which the axis is transverse to the path of movement of the slide, said rocker having also a guideway extending in the general direction of the path of the slide, a link fitted in said guideway for sliding movement only relatively to the rocker, a pivotal connection between one end of said link and said lever, a connecting rod in pivotal connection with the other end of said link at the opposite side of the rocker fulcrum from the first named pivotal connection, a crank operatively associated with the connecting rod to impart oscillative movement to the rocker through the pivotal connection of the connecting rod with the link, and a cam operatively associated with said slide for imparting movement to the slide in its prescribed path.

9. A gear shaping machine comprising a supporting structure, a cutter spindle mounted to reciprocate on said supporting structure, a cutter carried by said spindle, a lever coupled with said spindle to impart reciprocating motion thereto having an arm extending from its point of engagement with the supporting structure, a slide mounted to move in a path toward and away from said spindle, a rocker having a pivotal connection with said slide of which the axis is transverse to the path of movement of the slide, said rocker having also a guideway extending in the general direction of the path of the slide, a link fitted in said guideway for sliding movement only relatively to the rocker, a pivotal connection between one end of said link and said lever, a connecting rod in pivotal connection with the other end of said link at the opposite side of the rocker fulcrum from the first named pivotal connection, a crank operatively associated with the connecting rod to impart oscillative movement to the rocker through the pivotal connection of the connecting rod with the link, a work holder operatively associated with said spindle to support and move the work piece in operative relation to said cutter, and mechanism cooperating with the work holder for shifting said slide in timed relation with the movements of the work holder.

10. A machine for cutting teeth in a zone of variable width between flanking shoulders of a work piece, which comprises a work holder adapted to support such a work piece and being movable to effect traverse of the variable-width zone thereof past a cutting position, a cutter holder, a cutting tool carried thereby, said cutter holder being reciprocatable and being so disposed as to reciprocate the cutting tool in a path at the cutting location which crosses the traversing path of the variable width zone of the work piece, means including a driving crank and a linkage having a shiftable fulcrum for reciprocating the cutter holder with variable length of stroke, and means timed with the movement of the work holder for shifting such fulcrum so as to vary the length of strokes of the cutting tool in correlation with the changing width at the cutting location of the work piece zone wherein teeth are cut.

11. A machine for cutting teeth in a zone of variable width between flanking shoulders of a work piece, which comprises a work holder adapted to support such a work piece and being movable to effect traverse of the variable-width zone thereof past a cutting location, a cutter holder, a cutting tool carried thereby, said cutter holder being reciprocatable and being so disposed as to reciprocate the cutting tool in a path at the cutting location which crosses the traversing path of the variable width zone of the work piece, and means for so reciprocating the cutter holder including a rocker having a fulcrum shiftable toward and away from the spindle, connections for transmitting reciprocation from said rocker to the spindle, means for oscillating the rocker about its fulcrum, and means timed with the progress of the work holder for shifting the rocker fulcrum so as to correlate the length of strokes of the cutting tool with the changing width at the cutting location of the work piece zone wherein teeth are cut.

ARTHUR I. BEAN.

REFERENCES CITED

The following references are of record in the file of this patent:

UNITED STATES PATENTS

| Number | Name | Date |
|---|---|---|
| 308,653 | Clemson | Dec. 2, 1884 |
| 712,934 | Johnson | Nov. 4, 1902 |
| 1,892,765 | Howard | Jan. 3, 1933 |
| 1,927,307 | Carter | Sept. 19, 1933 |
| 2,108,311 | Harris | Feb. 15, 1938 |
| 2,129,858 | Miller | Sept. 13, 1938 |
| 2,190,506 | Wurr | Feb. 13, 1940 |
| 2,197,730 | Mugford | Apr. 16, 1940 |